SEISMIC WELL LOGGING DATA DISPLAY

Original Filed Feb. 1, 1960 3 Sheets-Sheet 1

ROBERT L. GEYER
NEIL R. SPARKS
*INVENTORS*

BY Newell Potter

*ATTORNEY*

SEISMIC WELL LOGGING DATA DISPLAY

Original Filed Feb. 1, 1960 2 Sheets-Sheet 2

ROBERT L. GEYER
NEIL R. SPARKS
*INVENTORS*

BY Newell Potter

*ATTORNEY*

United States Patent Office

Re. 25,928
Reissued Dec. 7, 1965

25,928

SEISMIC WELL LOGGING DATA DISPLAY

Robert L. Geyer and Neil R. Sparks, both of Tulsa, Okla., assignors to Pan American Petroleum Corporation, Tulsa, Okla., a corporation of Delaware Original No. 3,093,810, dated June 11, 1963, Ser. No. 5,882, Feb. 1, 1960. Application for reissue June 8, 1965, Ser. No. 463,069
16 Claims. (Cl. 340—18)

Figures 1, 2:
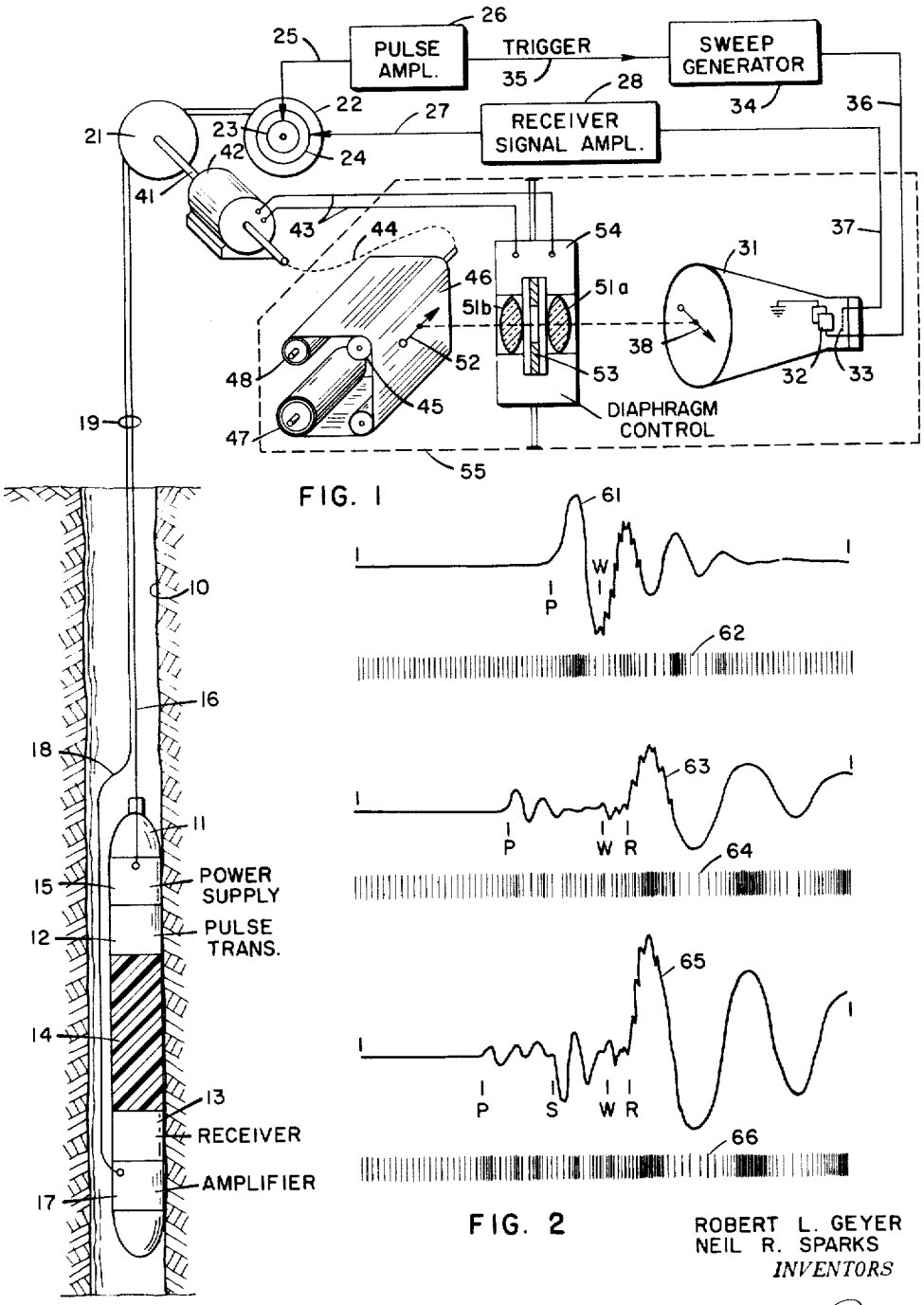

Matter enclosed in heavy brackets [ ] appears in the original patent but forms no part of this reissue specification; matter printed in italics indicates the additions made by reissue.

This invention relates to seismic velocity well logging and is directed particularly to a method and apparatus for obtaining and recording improved seismic velocity well logs. More specifically, the invention is directed to improvements in the display of the data obtained.

Seismic velocity well logging as presently practiced comprises transmitting a high-frequency acoustic impulse into the well-bore fluids and the surrounding formations and detecting the first-arriving impulse at a detector in the well a short distance away, typically about five feet. At such a distance a wave train of substantial length, made up of a number of different wave arrivals, can be readily detected. Only the first-arriving impulse is ordinarily utilized, however, since it is the wave which travels through the formations and thus indicates the formation compressional seismic-wave velocity. Nevertheless, it has been recognized that the later wave arrivals give by their frequencies, arrival times, and amplitudes, valuable additional information about the well formations. Such later wave arrivals have been recorded along with the first-arriving impulses by photographing their form on the face of a cathode ray oscilloscope, but such a display has the disadvantage that it is of undue length. Further, it is only by a careful study of each of a large number of individual oscillograms that changes in the formation lithology can be understood.

In view of the foregoing it is a primary object of our invention to provide a novel and improved method and apparatus for recording and displaying the data obtained in seismic velocity well logging. More particularly, it is an object of our invention to provide a method and apparatus for recording and displaying the seismic velocity log data in a form which is both compact and complete as to the form and arrival times of various waves of interest. Other and further objects, uses, and advantages of the invention will become apparent as the description proceeds.

Briefly stated, the foregoing and other objects are accomplished by recording the wave form of the received wave impulses as variable-density traces which extend across the log record strip perpendicular to the depth dimension. Preferably, the pulse repetition rate and speed of record strip movement are such that adjacent traces overlap appreciably, so that the resultant record presents an over-all intermediate density for zero signal amplitude, but which density varies between greater and smaller values for plus and minus values of the signal amplitude.

A preferred apparatus for practicing our invention comprises means for photographing the face of an oscilloscope tube on which the horizontal sweep is synchronized with the transmission of acoustic impulses through the subsurface formations, and the beam intensity is varied in accordance with variations in the received signal. In order to prevent density variations in the final record due to variations in the logging speed, means are provided to vary the photographic exposure in accordance with the logging speed variations.

Figure 3:
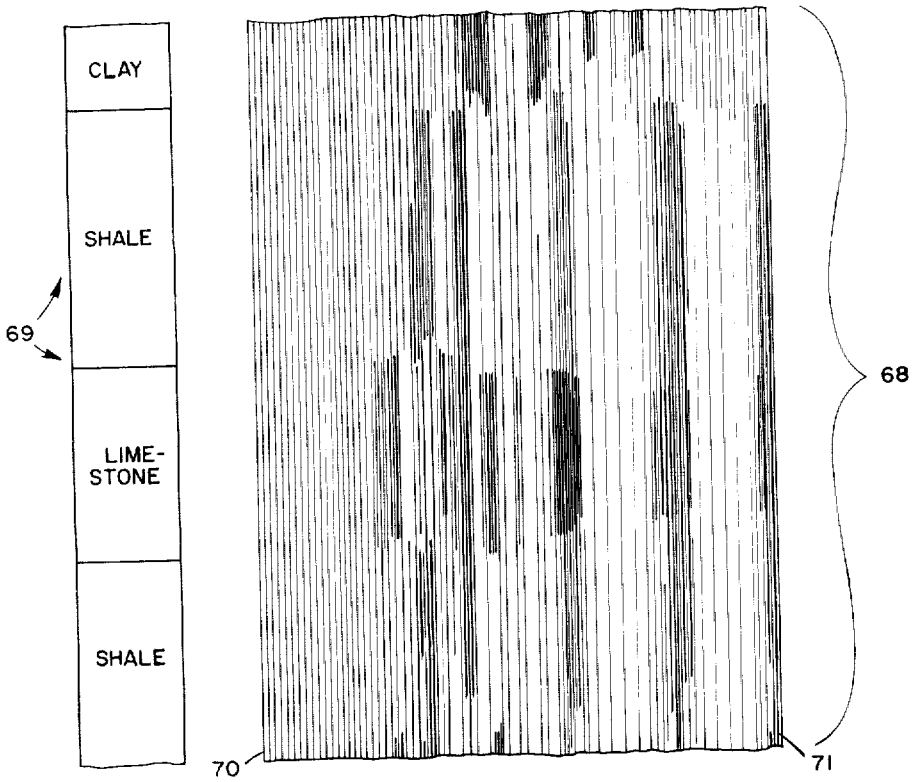

This will be better understood by reference to the accompanying drawings forming a part of this application and illustrating a typical embodiment of our invention and the results produced thereby. In these drawings, FIGURE 1 is a diagrammatic illustration of a recording system and subsurface logging instrument embodying our invention;

FIGURE 2 shows various wave forms typically observed in the operation of the invention; and FIGURE 3 is a representation of a portion of a typical log obtained by our invention correlated with the lithology responsible for the observed wave forms.

Referring now to these drawings in detail and particularly to FIGURE 1 thereof, in a well bore 10 is shown a logging instrument 11 comprising essentially a pulse transmitter 12 and a pulse receiver 13 separated by an acoustic insulator 14. The spacing between transmitter 12 and receiver 13 is typically about five feet. In operation, the pulse transmitter 12 is periodically actuated by a power supply 15 to transmit into the bore hole fluids and the surrounding formations a high-frequency acoustic impulse, the time of starting of the impulse being transmitted to the ground surface over a lead 16. The resulting impulses after travel by various paths to the receiver 13 are amplified by an amplifier 17 connected thereto and transmitted over a lead 18 to the ground surface. Typically, the leads 16 and 18 are insulated and comprise parts of a cable 19 by which the instrument 11 is raised or lowered in the well 10.

At the ground surface the cable 19 passes over a measuring wheel 21 to a drum 22 where the lead 16 is brought out to a slip ring 23, while the lead 18 is brought out to a slip ring 24. By a brush and lead 25 the slip ring 23 is connected to a pulse amplifier 26 while a brush and lead 27 connect the slip ring 24 to a receiver signal amplifier 28.

The recording apparatus comprises a cathode-ray oscillograph tub 31 having horizontal sweep electrodes 32 and a beam-intensity control electrode 33. A sweep voltage generator 34 triggered over the conductor 35 from the pulse amplifier 26 transmits a sweep voltage over the lead 36 to the electrodes 32. Similarly, the beam-intensity control electrode 33 is connected to the output of receiver signal amplifier 28 by the lead 37. Accordingly, the intensity of the beam of tube 31 is varied in accordance with the amplitude variations of the signal received at the receiver 13. By triggering sweep generator 34 at the instant of generation of the impulse by transmitter 12 through the system described, a linear trace 38 varying in intensity along its length is presented on the face of oscilloscope 31.

By means of a mechanical connection 41, the depth-measuring wheel 21 over which passes the cable 19 drives a direct-current electric generator 42 to produce on the output leads 43 of the generator a voltage varying in amplitude with the rate of rotation of wheel 21 and thus with the speed of movement of the instrument 11 in well 10. The rotation of measuring wheel 21 is further transmitted by a connection 44 to a roller or sprocket 45 which drives a film or photosensitive paper strip 46 from a supply roll 47 to a takeup roll 48. Between the face of oscilloscope 31 and film 46 is a lens system made up of the elements 51a and 51b which focuses on the film or photosensitive paper 46 an image 52 of the oscilloscope trace 38. The transmission of light from the trace 38 to the image 52 through the lenses 51a and 51b is controlled by a variable diaphragm 53 actuated from a diaphragm-control mechanism 54 which responds to the voltage on leads 43 of the generator 42.

In operation, the pulses emitted by transmitter 12 are normally sent out at a constant repetition rate, while the speeds of movement of instrument 11 through the well 10 and of the film 46 are also usually constant but sometimes may vary. In the absence of the diaphragm 53 and control 54, and assuming that there is such overlap in successive passes of the image 52 that the density at any point is the result of several exposures, variations in speed would result in a varying density of the photographic record of the image 52, over and above the variations introduced by modulation of the cathode-ray beam by the control electrode 33 in accordance with signal wave form. By regulating the opening of diaphragm 53 in proportion to the film movement or logging speed, however, as it is measured by the tachometer generator 42, the intensity of the light transmitted from trace 38 to the image 52 is varied just sufficiently to compensate for the effect of the speed change. For example, if the logging speed and speed of movement of the film 46 increase, the diaphragm 53 opens sufficiently so that the additional light transmitted through the lens system just compensates for what would otherwise be a reduction in accumulated exposure at any point of the film 46. As a result, the density variations of the film 46 are independent of the speed of movement of the instrument 11 and of the film 46 and vary only with the wave form of the received signals. As will be apparent, the oscilloscope 31, the film 46 and its associated mechanism, and the lens and diaphragm control 54 should be surrounded by a light-excluding box or enclosure schematically indicated by the dashed line 55.

While the system just described is a direct-recording system, in that the signals are immediately translated into intensity variations and recorded while the logging proceeds, the same final presentation can be made indirectly by storing the signals in reproducible form and reproducing them at any subsequent time. For example, the trigger pulses, received signals, and logging speed and depth indications can be first recorded on separate tracks of a magnetic tape, and later reproduced by magnetic playback heads, with or without additional filtering or other modifications or corrections, to provide the variable-density display of this invention.

In FIGURE 2 are shown examples of certain typical wave forms which are reported by Vogel in Geophysics, vol. XVII, page 588, to have been observed in the course of subsurface seismic velocity logging. Thus, the trace 61 is said to be typical of the form of the waves received by bore hole instrument such as 11 when the surrounding formation is largely clay. The event beginning at the time marked P is the first arrival through the clay and is a compressional wave. The arrival beginning at the time marked W, of considerably higher frequency than that starting at P, is the wave transmitted primarily through the bore-hole liquid. While the liquid-borne wave W is here shown of substantially less amplitude than the compressional wave P, it may often be of quite large amplitude.

The variable-density trace 62 adjacent the deflection-galvanometer trace 61 corresponds to the trace 61 and wave forms recorded thereby translated into variable-density or variable-intensity form. From end to end these traces correspond to a time span of about 2 milliseconds. This span was considered appropriate for the instrument and spacing dimensions used, but may differ for other instruments. The time elapsed before the beginning of the wave at P is the travel time of an acoustic impulse from the transmitter 12 to the receiver 13 primarily through the clay formation when the spacing between the source and receiver is about five feet.

Deflection-galvanometer trace 63 is the same type of recording as trace 61 except that it is made in a shale formation. As before, the events marked P and W correspond to the initiation of the compressional and the water-borne waves, while the event marked R corresponds to the start of a wave which is not identified on trace 61 but which is believed to be a Rayleigh-type wave that travels principally along the well wall and is sometimes called a tube wave. As before, the variable-intensity trace 64 corresponds in form to the variable-deflection trace 63. The earlier occurrence of the P wave in trace 63, as compared with 61, corresponds to the higher value of seismic compressional-wave velocity in shale as compared with clay.

The trace 65 is similar to 61 and 63 except that it is the type of wave train recorded when the instrument 11 is surrounded by limestone rather than clay or shale. The various arrivals indicated by P, W, and R are the same as those for the wave 63. In the case of limestone and similar crystalline hard rocks, however, there is frequently also observed a shear-wave arrival, here designated by S. The relatively earlier arrival time of the P wave for limestone, as compared with its arrival in shale in trace 63, corresponds to the generally higher velocity of seismic compressional waves in limestone as compared with shale. Trace 66 corresponds to trace 65 but is in variable-density form.

It will be understood that the showing of this figure and of FIGURE 3 is highly diagrammatic, in that the numerous gradations of density corresponding to the details of the wave form of the trace 65 cannot be satisfactorily shown by the inked-line drawing, whereas they will be apparent in a photographic recording of the actual trace. It is intended that the respective deflection and variable-density traces be such duplicates that the deflection trace would result from scanning the variable-density trace with a light beam and photocell, for example, and applying the amplified photocell output to a galvanometer.

FIGURE 3 suggests the appearance of a portion of a well log recorded in accordance with our invention. Thus, the log 68 corresponds to the variable-density recording obtained from a well having the lithology indicated by the lithologic log 69 on the left, using an instrument 11 and recording system such as is shown in FIGURE 1. The edge 70 forms a base line parallel to the edge of film strip 46 corresponding to zero time, when pulse emission by transmitter 12 occurs, while edge 71 corresponds to a time about two milliseconds later. The distance from base line 70 varies linearly with time in this two-millisecond interval. The width of the uniform-density area between base line 70 and the first wave arrivals is thus directly proportional to the pulse travel time through the formation, and is therefore inversely proportional to the formation seismic compressional-wave velocity. Thus, the log 68 contains all the information present on a first-arrival log and in addition shows the amplitude, phase, frequency, and arrival times of the subsequent waves. Obviously, much more information is available here for lithologic interpretation.

Furthermore, the changes in wave form as the logging instrument passes from one formation to another are indicated much more clearly on the common time scale than they would be on separate deflection traces each with its own scale.

The choice of the speed of movement, or the depth scale factor, of the film 46 in relation to the logging speed, to the pulse-repetition rate of transmitter 12, and to the thickness of the trace 38 or its image 52 is a matter of some importance. It is preferred that they be so related that the photographic exposure at any point of film 46 is the resultant of several sweeps of the oscilloscope beam. Any random noise superimposed on the desired signal in one sweep then tends to cancel random noise on another sweep while the desired signals all combine additively. Thus, the final recording of the wave form at any point of depth is the summation of a number of similar wave forms. It has a higher signal-to-noise ratio than is likely for any single member of the summation. Accordingly, when this method of recording is used, the required amplitude of pulse emission by transmitter 12 is reduced for results with the signal-to-noise ratio now considered acceptable. Or alternatively, pulses of the strength now employed can be transmitted over larger distances than have been considered feasible heretofore.

Although the application of the invention to seismic velocity logging with a single detector has been described in detail, it can also be used with two-detector logging instruments, wherein the difference in arrival times at the two differently spaced detectors is the most important quantity for showing velocity. Preferably each of the two receivers intensity-modulates the beam of one of a pair of cathode-ray oscilloscopes, just as the single receiver 13 does oscilloscope 31 in FIGURE 1. The images of the two oscilloscope traces are preferably placed side by side on the film 46, so that the log produced appears as two parallel bands each similar to log 68. Besides showing in this way the complete wave trains arriving at each of the two receivers, the desired difference in first-arrival times, on the time difference between any other wave arrivals, such as the shear-wave arrivals at the two detectors, can be determined simply by scaling the distance between the arrivals in the two bands. This assumes that the sweep velocities of the two oscilloscopes are the same, which can be assured by using the same sweep generator for both.

While our invention has been described by reference to the foregoing details and examples, its scope should not be considered as limited to these details, but is properly to be ascertained from the appended claims.

We claim:

1. The method of recording seismic well logs while moving a seismic impulse transmitter and a receiver of seismic waves through a well at substantially constant speed while maintaining said transmitter and receiver a small fixed distance apart and repeatedly causing said transmitter to emit impulses and said receiver to detect the resultant seismic waves impinging thereon, which recording method comprises moving a record-receiving strip lengthwise in proportion to the speed of moving said transmitter and receiver through said well, initiating a mark at a base line parallel to the edge of said strip substantially synchronously with the emission of each impulse by said transmitter, extending said mark continuously and linearly with time across said strip in the direction of its width during the time interval while the seismic waves resulting from said impulse are traveling to and are being received by said receiver, and varying the density of said mark in proportion to the instantaneous amplitude of the waves received by said receiver.

2. A method as in claim 1 in which said recording method comprises moving a photosensitive record strip lengthwise at a rate proportional to the speed of moving said transmitter and receiver through said well, projecting an exposure-producing light beam of intermediate intensity onto said strip at a constant distance from its edge in synchronism with each emission of an impulse by said transmitter, sweeping said beam transversely across said strip in the direction of its width at a substantially constant rate during the time of traveling and arrival at said receiver of the resultant waves of said each impulse emission, and varying the intensity of said beam from said intermediate intensity in proportion to the instantaneous positive and negative amplitudes of the waves impinging on said receiver.

3. A recording method as in claim 2 in which the distance of lengthwise movement of said strip in the time interval between any two successive pulse emissions by said transmitter is substantially less than the thickness of said beam, whereby the exposure at any exposed point on said strip accumulates during a plurality of sweeps of said beam.

4. The method of recording seismic well logs while moving a seismic impulse transmitter and a receiver of seismic waves through a well at a speed which may vary while maintaining said transmitter and receiver a small fixed distance apart and repeatedly causing said transmitter to emit impulses and said receiver to detect the resultant seismic waves impinging thereon, which recording method comprises moving a record-receiving strip lengthwise in proportion to the speed of moving said transmitter and receiver through said well, initiating a mark at a base line parallel to the edge of said strip substantilaly synchronously with the emission of each impulse by said transmitter, extending said mark linearly with time across said strip in the direction of its width during the time interval while the seismic waves resulting from said impulse are traveling to and being received by said receiver, varying the instantaneous density of said mark in proportion to the instantaneous amplitude of the waves received by said receiver, and varying the average density of said mark in proportion to the speed of moving said transmitter and receiver through said well.

5. A method as in claim 4 in which said recording method comprises moving a photosensitive record strip lengthwise at a rate proportional to the speed of moving said transmitter and receiver through said well, projecting an exposure-producing light beam of intermediate intensity onto said strip at a constant distance from its edge in synchronism with each transmission of an impulse by said transmitter, sweeping said beam transversely across said strip in the direction of its width at a substantially constant rate during the time of traveling and arrival at said receiver of the resultant waves of said each impulse emission, varying the instantaneous intensity of said beam from said intermediate intensity in proportion to the instantaneous positive and negative amplitudes of the waves impinging on said receiver, and varying said intermediate intensity in proportion to the speed of moving said seismic impulse transmitter and receiver through said well.

6. A recording method as in claim 5 in which the distance of lengthwise strip movement in the time interval between successive pulse emissions by said transmitter is substantially less than the thickness of said beam in the lengthwise direction of said strip, whereby the exposure at any exposed point on said strip accumulates during a plurality of sweeps of said beam.

7. Apparatus for recording seismic well logs while moving a seismic impulse transmitter and receiver of seismic waves through a well at substantially constant speed while maintaining said transmitter and receiver a small fixed distance apart and repeatedly causing said transmitter to emit impulses and said receiver to detect the resultant seismic waves impinging thereon, said recording apparatus comprising means for moving a record-receiving strip lengthwise at a rate proportional to the rate of movement of said transmitter and receiver in said well, means actuated by said transmitter for producing transverse marks of an intermediate density on said strip, each of said marks starting from a base line parallel to the strip edge in synchronism with the emission of an impulse by said transmitter and being drawn across said strip during the travel and arrival of the resultant seismic waves at said receiver, and means actuated by said receiver for controlling said mark-producing means to vary said intermediate density of marking in proportion to the instantaneous values of the amplitude of the waves received by said receiver.

8. Apparatus as in claim 7 wherein said recording apparatus comprises means for moving a photosensitive record strip lengthwise at a rate proportional to a speed of movement of said transmitter and receiver through said well, a source of exposure-producing light, means actuated by said transmitter for projecting an exposure-producing beam of intermediate intensity from said light source onto said strip at a constant distance from its edge in synchronism with each emission of an impulse by said transmitter, means for sweeping said beam transversely across said strip in the direction of its width at a substantially constant rate during the time of traveling and arrival at said receiver of the resultant waves of each impulse emission, and means actuated by said receiver for varying the instantaneous intensity of said beam from said intermediate intensity in proportion to the instantaneous positive and negative amplitudes of the waves impinging on said receiver.

9. Apparatus as in claim 8 in which the thickness of said beam in the lengthwise direction of said strip is substantially greater than the distance of lengthwise strip movement between successive pulse emissions by said transmitter, whereby the exposure at any exposed point on said strip accumulates during a plurality of sweeps of said beam.

10. Apparatus for recording seismic well logs while moving a seismic impulse transmitter and a receiver of seismic waves through a well at a speed which may vary while maintaining said transmitter and receiver a small fixed distance apart and repeatedly causing said transmitter to emit impulses and said receiver to detect the resultant seismic wave impinging thereon, said recording apparatus comprising means for moving a record-receiving strip lengthwise in proportion to the movement of said transmitter and receiver in said well, means actuated by said transmitter for initiating marking of said strip at a base line on said strip parallel to one edge thereof in synchronism with the emission of an impulse by said transmitter, means for extending the mark produced by said mark-initiating means across said strip at a constant rate during the time of travel and arrival of the seismic waves resulting from said impulse at said receiver, means actuated by said receiver for varying the density of marking of said strip above and below an average density in proportion to the positive and negative instantaneous amplitudes of the wave impinging on said receiver, means responsive to the speed of movement of said transmitter and receiver, and means actuated by said speed-responsive means to change said average density in proportion to changes in said speed.

11. Apparatus as in claim 10 wherein said recording apparatus comprises means for moving a photosensitive record strip lengthwise in accordance with the movement of said transmitter and receiver through said well, a light source, means for projecting a beam of exposure-producing light from said source onto said record strip, means for sweeping said beam across said strip in the direction of its width at a substantially constant rate, means actuated by said transmitter for initiating the sweeping of said beam by said beam-sweeping means at a base line on said strip synchronously with the emission of each impulse by said transmitter, means actuated by said receiver for varying the intensity of said beam impinging on said strip from an average value in proportion to the positive and negative instantaneous amplitudes of the waves impinging on said receiver, means responsive to the speed of movement of said transmitter and receiver through said well, and means actuated by said speed-responsive means for varying the average value of said intensity in proportion to the variations of said speed detected by said speed-responsive means.

12. Apparatus as in claim 11 in which the thickness of said beam in the lengthwise direction of said strip is substantially greater than the distance of lengthwise strip movement between successive pulse emissions by said transmitter, whereby the exposure at any exposed point on said strip accumulates during a plurality of sweeps of said beam.

*13. The method of recording seismic well logs while moving a seismic impulse transmitter and a receiver of seismic waves through a well at substantially constant speed while maintaining said transmitter and receiver a small fixed distance apart and repeatedly causing said transmitter to emit impulses and said receiver to detect the resultant seismic waves impinging thereon, which recording method comprises moving a record-receiving strip lengthwise in proportion to the speed of moving said transmitter and receiver through said well, initiating a mark at a base line parallel to the edge of said strip substantially in synchronism with the transmission of each impulse through the well formations, extending said mark continuously and linearly with time across said strip in the direction of its width during the time interval while the seismic waves resulting from said impulse are being received by said receiver, and varying the density of said mark in proportion to the instantaneous amplitude of the waves received by said receiver.*

*14. A method as in claim 13 in which said recording method comprises moving a photosensitive record strip lengthwise at a rate proportional to the speed of moving said transmitter and receiver through said well, projecting an exposure-producing light beam of intermediate intensity onto said strip at a constant distance from its edge in synchronism with the transmission of each impulse through the well formations, sweeping said beam transversely across said strip in the direction of its width at a substantially constant rate during the time of arrival at said receiver of the resultant waves of each impulse emission, and varying the intensity of said beam from said intermediate intensity in proportion to the instantaneous positive and negative amplitudes of the waves impinging on said receiver.*

*15. Apparatus for recording seismic well logs by moving a seismic impulse transmitter and a receiver of seismic waves through a well at substantially constant speed while maintaining said transmitter and receiver a small fixed distance apart and repeatedly causing said transmitter to emit impulses and said receiver to detect the resultant seismic waves impinging thereon, said recording apparatus comprising means for moving a record-receiving strip lengthwise at a rate proportional to the rate of movement of said transmitter and receiver in said well, means actuated in synchronism with the transmission of each impulse through the well formations for producing transverse marks of an intermediate density on said strip, each of said marks starting from a base line parallel to the strip edge and being drawn across said strip during the arrival of the resultant seismic waves at said receiver, and means actuated by said receiver for controlling said mark-producing means to vary said intermediate density of marking in proportion to the instantaneous values of the amplitude of the waves received by said receiver.*

*16. Apparatus as in claim 15 wherein said recording apparatus comprises means for moving a photosensitive record strip lengthwise at a rate proportional to the speed of movement of said transmitter and receiver through said well, a source of exposure-producing light, means actuated in synchronism with the transmission of each impulse through the well formations for projecting an exposure-producing beam of intermediate intensity from said light source onto said strip at a constant distance from its edge, means for sweeping said beam transversely across said strip in the direction of its width at a substantially constant rate during the time of arrival at said receiver of the resultant waves of each impulse emission, and means actuated by said receiver for varying the instantaneous intensity of said beam from said intermediate intensity in proportion to the instantaneous positive and negative amplitudes of the waves impinging on said receiver.*

References Cited by the Examiner

The following references, cited by the Examiner, are of record in the patented file of this patent or the original patent.

(Other references on following page)

UNITED STATES PATENTS

| | | | |
|---|---|---|---|
| 2,510,121 | 6/1950 | Lehmann | 179—100.3 |
| 2,527,562 | 10/1950 | McCormick | 346—110 |
| 2,537,105 | 1/1951 | Vrick | 315—24 |
| 2,704,364 | 3/1955 | Summers | 181—.5 |
| 2,877,080 | 3/1959 | Eisler | 346—74 |
| 2,907,621 | 10/1959 | Eisler | 346—74 |
| 3,048,847 | 8/1962 | Frost et al. | 346—110 |
| 3,081,838 | 3/1963 | Platt | 181—.5 |

BENJAMIN A. BORCHELT, *Primary Examiner.*

W. KUJAWA, *Assistant Examiner.*